No. 892,091. PATENTED JUNE 30, 1908.
W. T. SEARS.
DRIVING WHEEL LATHE.
APPLICATION FILED MAR. 4, 1908.
2 SHEETS—SHEET 1.
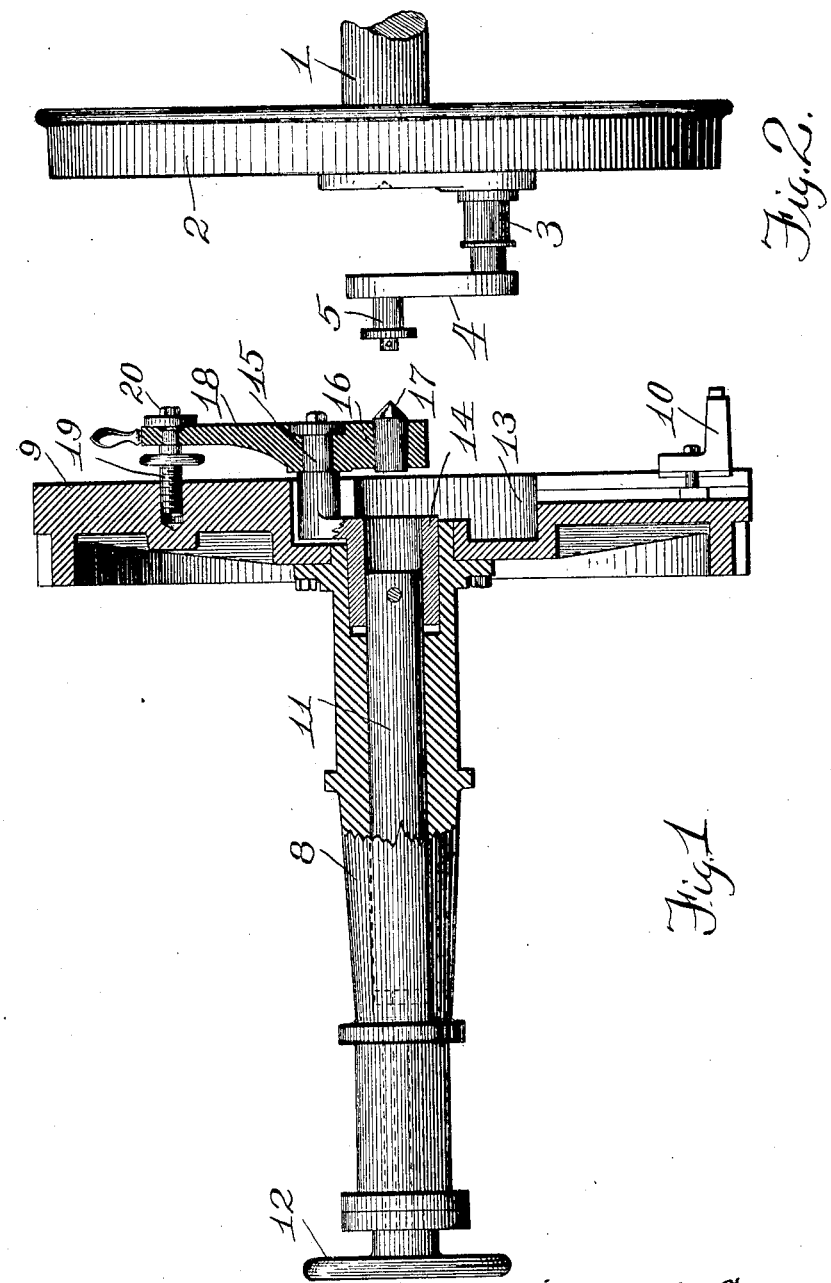
Witnesses:
Elmer R. Shipley.
M. S. Belden.
Willard T. Sears
Inventor
by James W. See
Attorney No. 892,091.  
PATENTED JUNE 30, 1908.  
W. T. SEARS.  
DRIVING WHEEL LATHE.  
APPLICATION FILED MAR. 4, 1908.
2 SHEETS—SHEET 2.
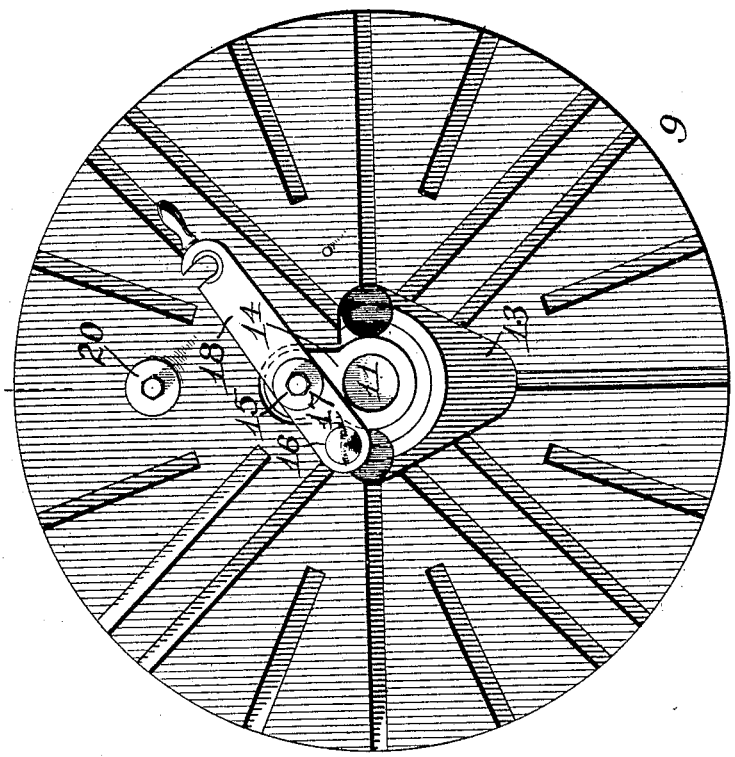
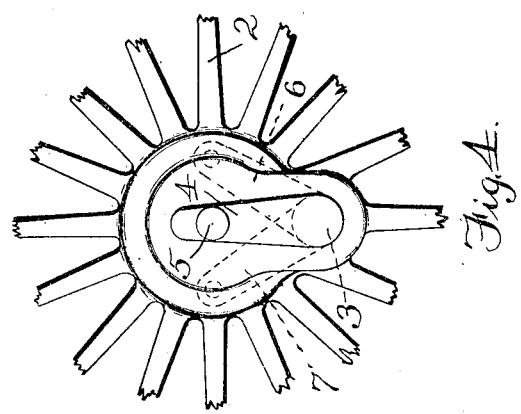
Witnesses:  
Elmer R. Shipley.  
M. S. Belden.
Willard T. Sears  
Inventor  
by James W. See  
Attorney

UNITED STATES PATENT OFFICE.

WILLARD T. SEARS, OF PHILADELPHIA, PENNSYLVANIA, ASSIGNOR TO NILES-BEMENT-POND COMPANY, OF JERSEY CITY, NEW JERSEY.

DRIVING-WHEEL LATHE.

No. 892,091.	Specification of Letters Patent.	Patented June 30, 1908.

Application filed March 4, 1908. Serial No. 419,193.

*To all whom it may concern:*

Be it known that I, WILLARD T. SEARS, a citizen of the United States, residing at Philadelphia, Philadelphia county, Pennsylvania, have invented certain new and useful Improvements in Driving-Wheel Lathes, of which the following is a specification.

This invention pertains to improvements in the peculiar type of driving wheel lathes disclosed in United States Patent No. 866885 on driving wheel lathes as the invention of Reiss and Wood, the lathe being intended to turn the tires of driving wheels provided with return cranks, the work to be done while the wheels are on their axle.

My improvements will be readily understood from the following description taken in connection with the accompanying drawings in which:—

Figure 1 is a vertical longitudinal section of the arbor of a driving wheel lathe exemplifying my invention: Fig. 2 an edge elevation of such a driving wheel as the lathe is intended to deal with: Fig. 3 a face view of the face-plate of the lathe: and Fig. 4 an elevation of the outer face of a portion of the driving wheel seen in Fig. 2.

Consideration will first be given to the character of the wheels to be dealt with, reference being now had particularly to Figs. 2 and 4 of the drawings in which:—1, indicates a locomotive axle: 2, one of the wheels thereon: 3, the crank pin: 4, the return crank: and 5, the wrist of the return crank.

As seen in Fig. 4 the wrist 5 of the return crank is concentric with the axle and it is to this wrist that eccentrics are to be secured, in other words, this return crank 4 is radial to the axis of the wheel. But in Fig. 4 there is shown, in dotted line, a return crank 6 carrying a wrist eccentric to the axle. This wrist itself forms an eccentric and this form of return crank is an alternative for the form shown in full lines at 4. At 7 is shown, in dotted line, a return crank similar to the form 6 but carrying its wrist on the opposite side of the axis of the wheel. My improved lathe is designed to deal with locomotive driving wheels fast on their axle regardless of which form of return crank the driving wheels may be provided with.

Giving consideration now to the construction of the lathe, so far as its features are of special present interest:—8, indicates the usual arbor of a driving wheel lathe: 9, the face-plate thereon: 10, one of the drivers, of the Teas type for causing the face-plate to transmit motion to the wheel and axle structure: 11, the usual center-spindle sliding axially in the arbor: 12, the usual adjusting device for moving the center spindle longitudinally relative to the arbor: 13, a large recess in the center of the face-plate, of form and dimension adapted to receive any of the forms of return cranks when the wheel and axle structure is properly centered in the lathe: 14, a head fast on the inner end of center spindle 11: 15, a wrist carried by a radial arm projecting from the head 14, this wrist projecting outwardly beyond the face of the face-plate: 16, an arm journaled on the wrist 15: 17, a lathe center carried by the inner end of arm 16, concentric with the axis of the arbor but adapted to be swung from that position: 18, a lever projecting outwardly from arm 16: 19, a screw threaded into the face-plate and adapted to engage a slot in lever 18 when the lever is in position corresponding with the concentric working position of center 17: and 20, a clamp-washer on the outer end of screw 19 and engaging the outer face of lever 18 while a shoulder on screw 19 engages the inner face of the lever.

It will be observed that center spindle 11 carries no center directly in its end, the center in the swinging lever taking its place. When the wheel and axle structure is to be put into the lathe, the clamp and screw arrangement at the outer end of lever 18 is thrown out of action and the lever turned to such position as to leave the front of the recess entirely open so that the return crank may enter the recess.

If the return crank and its wrist be of the disposition indicated at 4, (in Fig. 4) then the wrist will enter the head 14, while if the return crank and wrist is of the form illustrated by 6 and 7 in Fig. 4 then the wrist will take position to one side or the other of the head 14.

The wheel and axle structure having been thus located in the lathe, and the headstocks having been brought up to the wheels as usual in driving wheel lathes, the arm 16 is to be swung into the gap between the driving wheel and the return crank and, by shifting the center spindle 11 endwise, center 17 is to be adjusted into the usual center hole in the end of the axle leaving the wheel and axle structure supported on the centers 17. The arm 16 is then to be so swung that the notch in its outer end will engage the outer end of screw 19 and the screw is to be adjusted outwardly till its shoulder engages the rear surface of the lever. Clamp-washer 20 is then to be drawn up against the outer face of the lever a boss on the washer fitting a recess in the outer face of the lever, thus accurately doweling the lever in such position as will hold center 17 concentric to the axis of the arbor. When the wheel and axle structure is thus supported on centers 17, the drivers 10 are brought into action on the outer face of the tires and the turning of the tires proceeded with in the usual manner.

When the wheel and axle structure is to be removed from the lathe, the screw and clamp are to be released and center 17 withdrawn from the axle, after which the lever is to be swung to position to open the recess in the face-plate so as to permit the return crank to leave the recess.

I claim:—

1. A driving wheel lathe comprising, an arbor, a face-plate carried by the arbor and having a central recess adapted to receive a return crank, a spindle to slide axially in the arbor, means for adjusting the spindle endwise, a head on the inner end of the spindle, a wrist carried by the head eccentric to the arbor, a lever mounted on the wrist, a center carried by the lever and adapted to take position concentric with the axis of the arbor, and means for locking the lever against angular motion on the wrist when the center carried by it is in working position, combined substantially as set forth.

2. A driving wheel lathe comprising, an arbor, a face-plate carried by the arbor and having a central recess adapted to receive a return crank, a spindle to slide axially in the arbor, means for adjusting the spindle endwise, a head on the inner end of the spindle provided with a central recess to receive the wrist of a return crank of the type carrying a wrist concentric with the wheel-axle, a wrist carried by the head eccentric to the arbor, a lever mounted on the wrist, a center carried by the lever and adapted to take position concentric with the axis of the arbor, and means for locking the lever against angular motion on the wrist when the center carried by it is in working position, combined substantially as set forth.

WILLARD T. SEARS.

Witnesses:
HERMAN J. RUCH,
SAMUEL C. KANE.